United States Patent [19]

Nielsen

[11] Patent Number: 5,826,022
[45] Date of Patent: Oct. 20, 1998

[54] METHOD AND APPARATUS FOR RECEIVING ELECTRONIC MAIL

[75] Inventor: Jakob Nielsen, Atherton, Calif.

[73] Assignee: Sun Microsystems, Inc., Palo Alto, Calif.

[21] Appl. No.: 628,441

[22] Filed: Apr. 5, 1996

[51] Int. Cl.⁶ ................................................. G06F 17/00
[52] U.S. Cl. ........................................................ 395/200.36
[58] Field of Search ....................... 395/200.79, 200.36, 395/200.37; 340/422, 825.07, 825.46; 379/57

[56] References Cited

U.S. PATENT DOCUMENTS

| | | | |
|---|---|---|---|
| 5,258,739 | 11/1993 | DeLuca et al. | 340/825.44 |
| 5,379,031 | 1/1995 | Mondrosch et al. | 340/825.07 |
| 5,485,503 | 1/1996 | Diem | 379/57 |
| 5,515,513 | 5/1996 | Metzger et al. | 395/200.79 |
| 5,541,911 | 7/1996 | Nilakantan et al. | 370/422 |

FOREIGN PATENT DOCUMENTS

0720333A2  3/1996  European Pat. Off. .

OTHER PUBLICATIONS

Article entitled "Standard for the Format of ARPA Internet Text Messages", revised by David H. Crocker, Aug. 13, 1982, Dept. of Engineering, University of Delaware (RFC #822) pp. 1–48.

Traynor; "Computer E–Mail privacy Issues Unresolved"; The National Law Journal p. 82, Jan. 31, 1994.

Stahl; "Dangerous E–mail—Companies are finding that E–mail indiscretions can leave them legally vulnerable"; pp. 1–7, Sep. 12, 1994.

Wyle H.F; "A Wide Area Network Information filter", IEEE Comp. Soc. Press, Oct. 1991.

Terry D.B; "Replication in an information filtering system"; IEEE Comp. Soc. Press, Nov. 1992.

Joanne Pransky, "Robots: our future information intermediaries"; Information Tech & Libraries; Dec. 1995.

"Collabra groupware goes the client/server route"; Network World, Jul. 31, 1995. p. 31.

"Getting the Most out of Mail–Enabled applications", Managing office Tech, Mar. 1994.

"E–Mail gets Smarter"; by Suzanne Kantra; Computers & Software.

Sorel Reisman, "I have seen the future: it's flooded with EMail"; IEEE Software, May 1995 pp. 111–112.

Primary Examiner—Ellis B. Ramirez
Attorney, Agent, or Firm—Sun Microsystems, Inc.

[57] ABSTRACT

Apparatus, methods, and computer program products are disclosed to simplify a computer user's handling of electronic mail messages. The invention provides the computer user with a mechanism for ignoring a particular ongoing e-mail discussion until that ongoing discussion terminates.

20 Claims, 12 Drawing Sheets

METHOD AND APPARATUS FOR RECEIVING ELECTRONIC MAIL

BACKGROUND OF THE INVENTION

1. Field of the Invention

This invention relates to the field of Electronic Mail Management Systems. Specifically, this invention is a new and useful method, apparatus and computer program product for ignoring electronic mail (e-mail) messages that have subject matter that is no longer of interest to the recipient.

2. Background

Electronic mail provides a quick and convenient way for computer users to communicate. This communication is initiated by a message sender who composes the message using a text editing program, provides the e-mail address of the intended recipient, and often provides an indication of the content (subject matter) of the message by providing text in a "subject" field. Using well-understood technology this composed message is then sent to the recipient's computer address. The recipient's computer receives the message and stores it in the recipient's inbox. The recipient eventually reads, deletes, responds to, or otherwise processes the message stored within the inbox by using any of a number of e-mail programs well known in the art.

Because these messages travel across networks, they generally are constructed according to the *Standard for the Format of ARPA Internet Text Messages* specification (RFC822). This specification can be found on the world wide web of the Internet at address "http://www.cis.ohio-state.edu/htbin/rfc/rfc822.html". Messages formatted to the RFC822 standard have a header portion and an optional body portion that contains the text of the message. The header portion includes a number of fields that address and classify the message. The invention does not require the use of the RFC822 standard. So long as there exists a method to identify essential information the invention is applicable. This essential information comprises a list of the message recipients and a subject field for the message. The embodiment described herein uses the RFC822 protocol.

The header portion of a message contains fields composed of character strings comprising a field-name followed by a colon, followed by a field-body terminated by a carriage return/line feed. An example header field is:

"To: John Doe<CR><LF>".

In this example, the <CR> represents the ASCII carriage return character and the <LF> represents the ASCII line feed character. The header field-names are not case sensitive, thus, "to:" is equivalent to "TO:", "To:" or "tO:".

All embodiments of the invention use the information contained in the: "Subject:", "To:", and "Cc:" fields. The contents of these fields are specified by the person who composes the message. The "To:" field contains the addresses of the primary recipients of the message where the address of each recipient is separated by a comma. The "Cc:" field contains the addresses of the secondary recipients of the message (again each address is separated by a comma). The "Subject:" field often provides a summary, or indicates the nature, of the message. Although these fields are all initialized by the sender, the recipient fields are generally limited to actual Internet addresses. On the other hand, the subject field has no specific meaning and may, in fact, be blank or contain a random arrangement of characters. However, the subject field generally contains a short title representative of the message's subject matter. Some embodiments also use information contained in the "resent-to:","resent-cc:",or "in-reply-to:" fields. As described in RFC822, the resent fields are used for forwarded messages. That is, when one recipient receives a message, adds a comment on the message, and forwards (sends) the comments and original message to another. Some messages contain a machine-readable unique message identifier. The "in-reply-to:" field, if included, contains the message identifier of the message being replied to. One embodiments of the invention includes mechanisms for considering data from the in-reply-to field when determining the core subject matter of the message.

A sender can address a single message to many recipients by separating the addresses of the recipients with a comma. Each of these recipients may respond to the original message by sending a reply message to the same list of recipients (plus the original sender). Some of these recipients may then respond to the first reply message. These reply messages are termed follow-up messages to the original message. This process facilitates a vigorous discussion between the original sender and the recipients, as well as between the recipients—it also generates a high volume of messages.

Electronic Mail programs generally provide a mechanism so that the recipient can reply to a message. This mechanism generally allows the reply to be sent to the original sender, or to be sent to all of the original recipients in addition to the original sender. These e-mail programs use the same "Subject:" field-body text as the original message but generally prepend an indicator to the field-text portion of the subject header to indicate that the reply message relates to the subject matter of the original message. That is, that the reply message is continuing the discussion initiated by the original message. The modification to the subject field is generally made by prepending one of the following strings to the subject field-body text: "Re:","RE:","re:","ReN:","reN:", "REN:","Re[N]:","re[N]:", or "RE [N]:" (where "N" is an integer). Thus, the recipients of the reply to the original message can determine that the reply is directed to an ongoing discussion and not initiating a new discussion. Hence, a discussion evolves between the recipients relating to the subject matter of the original message.

This process has expanded into the distribution list concept. A distribution list is generally directed towards a particular subject matter (e.g., the copyright list "cni-copyright@cni.org"). Thus, people who are interested in the subject matter "subscribe" to the distribution list. Subscribers have their e-mail address added to the list of recipients for messages sent from the distribution list. Thus, when the distribution list receives a message it redistributes the message, using normal e-mail, to all the subscribers (recipients) of the distribution list. Distribution lists can be managed directly by some human agency, a program, or a combination of both. Some distribution lists are moderated in the sense that a human reviews all incoming messages prior to reposting them to the distribution list. Other distribution lists are not moderated. Thus, messages received by the unmoderated group are automatically redistributed to the rest of the subscribers without human review.

With e-mail discussions, particularly with unmoderated discussion lists, a recipient often loses interest in following a discussion about any given subject matter. When that recipient would rather not read the message it becomes electronic junk mail—a waste of time to open, read, and discard. Because it takes the recipient's time to discard these messages, they rapidly accumulate and soon dominate the recipient's inbox. In the case of distribution lists, the recipient can solve this problem by simply unsubscribing from the distribution list. Although this solution stops the e-junk-mail, this solution is overkill in that it also "ignores" all further messages from that distribution list. Often, a recipient is only interested in ignoring a discussion having a particular subject matter, not all the discussions available from the distribution list. Although the recipient could resubscribe once the recipient assumes the uninteresting discussion has ended, the recipient will lose messages having subject matter that the recipient continues to be interested in during the time the recipient unsubscribed. Moreover, this method does not immediately remove all such uninteresting messages from the recipient's e-mail inbox. Although messages sent subsequent to the unsubscribe event will not reach the recipient, those messages already in the recipient's inbox, but not yet viewed, still exist. Further, after the recipient unsubscribes from the distribution list the recipient often simply forgets to resubscribe. Finally, some uninteresting discussions are simply e-mail discussions that are not distributed through a distribution list and thus can not be avoided by unsubscribing from the distribution list.

Another approach to this problem is partially addressed in the prior art by creating recipient modifiable "filters" that ignore e-mail messages that the recipient does not desire to view. These filters examine each message for some condition. If the filter detects that condition in the message, the filter performs an operation on that message. These filter operations generally include a delete operation. Thus, uninteresting messages can be removed from incoming e-mail without intervention by the recipient. However, the messages that have already been stored in the recipient's inbox are generally not accessible to a filter. Thus, the recipient's unread messages in the recipient's inbox will not be removed by most filters. Further, even those filters that can remove messages from the recipient's inbox require the recipient to execute some additional command to do so. Also, filters are notoriously difficult for non-programmers to use and often require significant debugging. Finally, at some later date the recipient must remember to deactivate the filter to be able to read future interesting discussions of the same subject matter.

The invention addresses these problems and simplifies a recipient's use of e-mail by providing a mechanism for indicating that a particular ongoing discussion is to be ignored until the ongoing discussion terminates.

SUMMARY OF THE INVENTION

The present invention overcomes the disadvantages of the above described systems and provides an economical, high performance, adaptable system, apparatus, method, and computer program product for ignoring uninteresting electronic mail discussions. One aspect of the present invention is a computer controlled method of receiving electronic mail messages. The electronic mail user causes an uninteresting message to be processed to extract a discussion. This discussion is stored in an ignored discussion database. When the computer receives an electronic message, the computer examines the message to determine whether the received message is associated with an ignored discussion stored in the ignored discussion database. If the message is not associated with an ignored discussion, the message is saved in the recipient's inbox. However, if the message is associated with an ignored discussion, the message is not saved. The invention includes facilities to manage the ignored discussion to add and delete records.

In another aspect of the invention, a computer system is disclosed that comprises an ignored discussion database containing a recipient selected discussion. This database is accessed though a database management mechanism. This aspect of the invention also includes a mechanism that determines whether an received electronic message is associated with a recipient selected discussion in the ignored discussion database. If the received electronic message has no such association, the message is stored.

In another aspect of the invention, an apparatus is disclosed comprising a computer and a message management mechanism for ignoring electronic messages associated with uninteresting discussions.

Finally, another aspect of the invention discloses a computer program product to cause a computer to ignore electronic messages associated with uninteresting discussions.

DESCRIPTION OF THE DRAWINGS

The objects, features and advantages of the system of the present invention will be apparent from the following description in which.

NOTATIONS AND NOMENCLATURE

A procedure is a self-consistent sequence of steps leading to a desired result. These steps are those requiring physical manipulation of physical quantities. Usually these quantities take the form of electrical or magnetic signals capable of being stored, transferred, combined, compared, and otherwise manipulated. These signals are referred to as bits, values, elements, symbols characters, terms, numbers, or the like. It will be understood by those skilled in the art that all of these and similar terms are associated with the appropriate physical quantities and are merely convenient labels applied to these quantities.

The manipulations performed by a computer in executing computer instructions are often referred to in terms, such as adding or comparing, that are commonly associated with mental operations performed by a human operator. No such capability of a human operator is necessary in any of the operations described herein that form part of the present invention; the operations are machine operations. Useful machines for performing the operations of the invention include programmed general purpose digital computers or similar devices. In all cases the method of computation is distinguished from the method of operation in operating a computer. The present invention relates to method steps for operating a computer in processing electrical or other (e.g., mechanical, chemical) physical signals to generate other desired physical signals.

The invention also relates to apparatus for performing these operations. This apparatus may be specially constructed for the required purposes or it may comprise a general purpose computer as selectively activated or reconfigured by a computer program stored in the memory of a computer. The procedures presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description below.

Finally, the invention may be embodied in a computer readable medium encoded with an electronic mail application program.

DESCRIPTION OF THE PREFERRED EMBODIMENTS

Operating Environment

Figure 1:
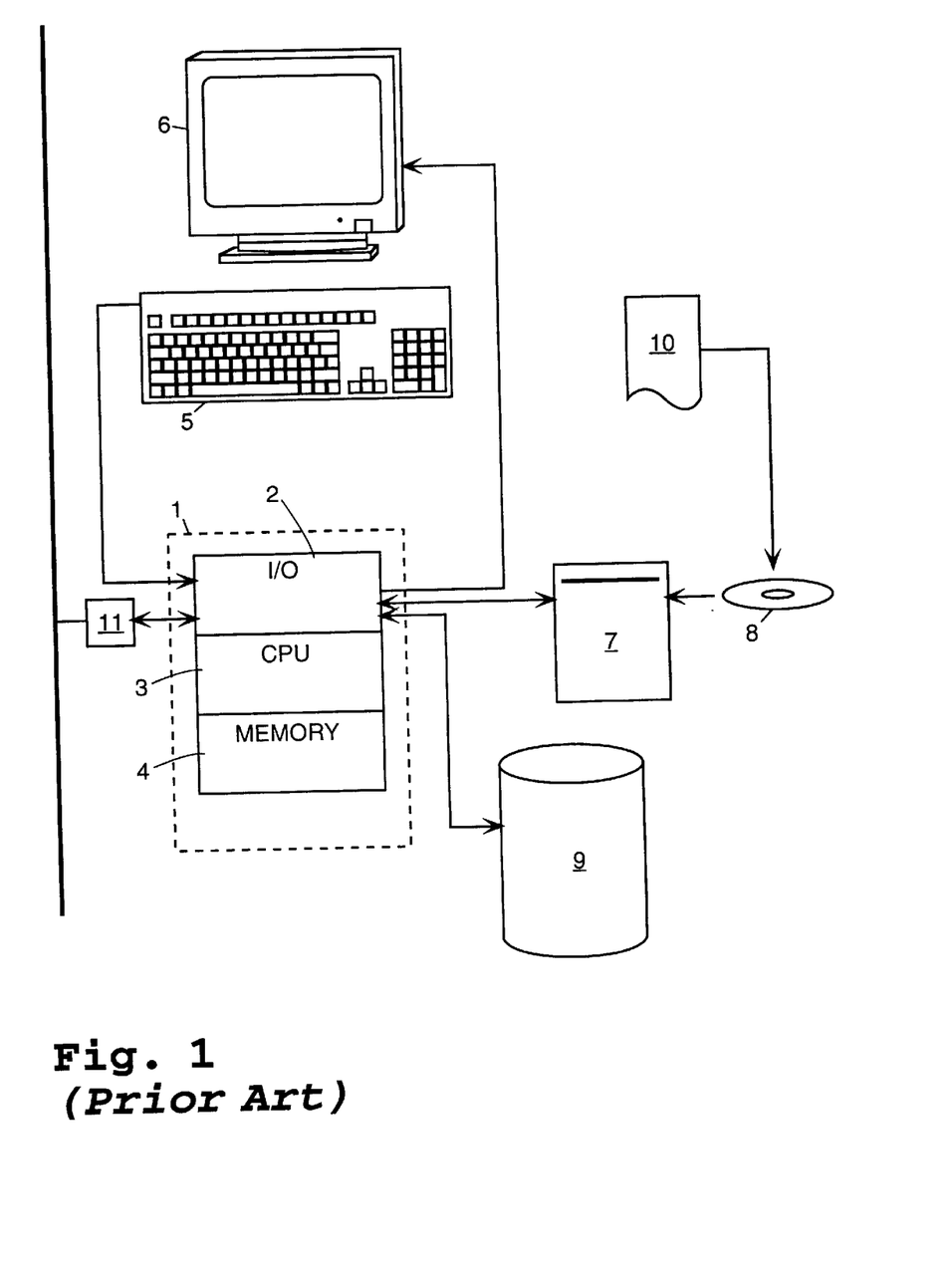
FIG. 1 illustrates a portion of a computer, including a CPU and a conventional memory in which the present invention may be embodied.

The invention is used with a computer system. Some of the elements of such a computer system are shown in FIG. 1, wherein a processor 1 is shown, having an Input/Output ("I/O") section 2, a central processing unit ("CPU") 3 and a memory section 4. The I/O section 2 is connected to a keyboard 5, a display unit 6, a disk storage unit 9, a network interface 11 and a CD-ROM drive unit 7. The CD-ROM unit 7 can read a CD-ROM medium 8 that typically contains programs 10 and data. Such a computer system is capable of executing electronic mail programs that embody the invention.

Figure 2:
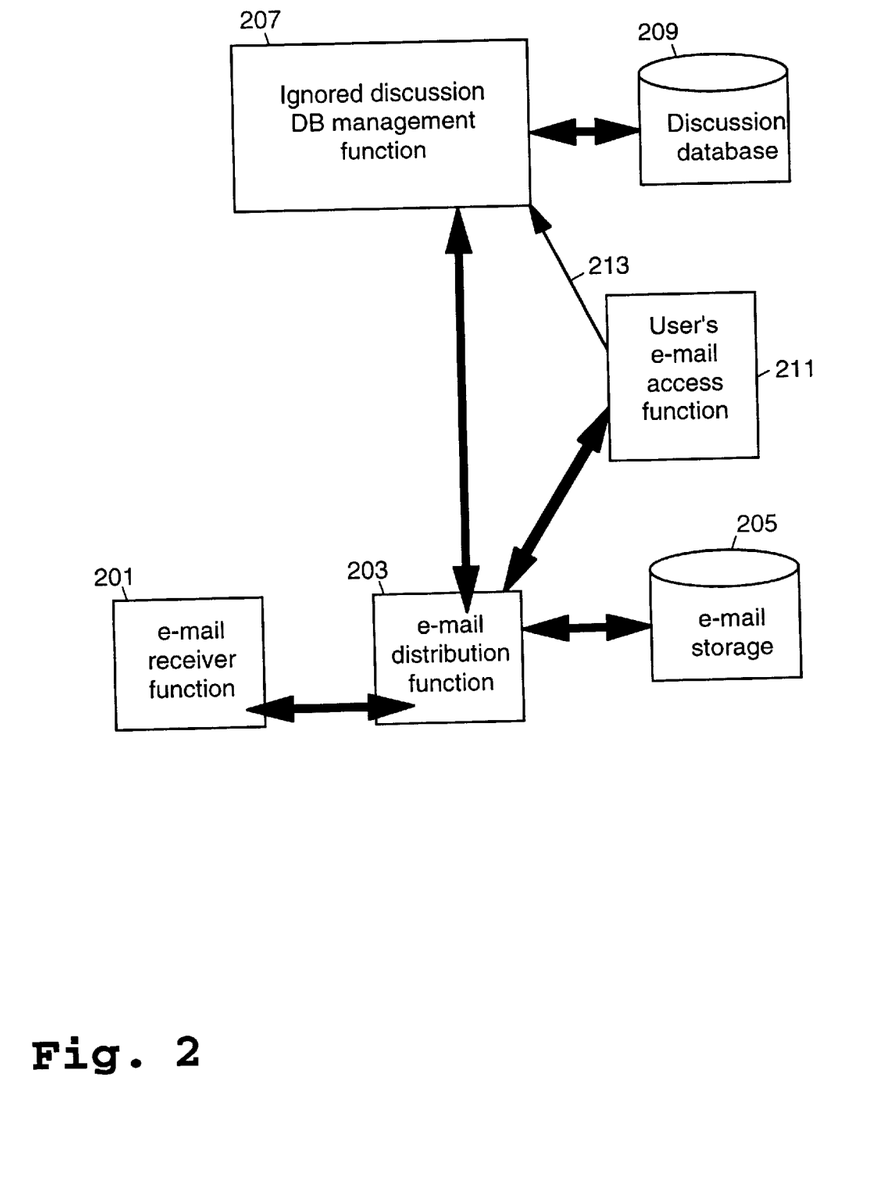
FIG. 2 illustrates the overall structure of the invention in accordance with a preferred embodiment.

FIG. 2 provides a conceptual overview of the invention as it fits within an e-mail system. The e-mail receiver function 201 receives a message. This message is then distributed to the recipient of the message by an e-mail distribution function 203 and if the message is not part of an ignored discussion, as determined by a message classification mechanism and examining the ignored discussion database 209, the message is stored in the recipient's e-mail inbox 205 using a message save mechanism. The recipient accesses these messages by using an e-mail access program 211. This program 211 provides the recipient with the capability to designate the current message as belonging to an ignored discussion. The e-mail access program 211 then communicates with the ignored discussion database management program 207 as indicated by the arrow marked as 213. Finally, the ignored discussion database management program 207 additionally performs operations on the ignored discussion database 209 to delete out-of-date records from the database 209.

Figure 3:
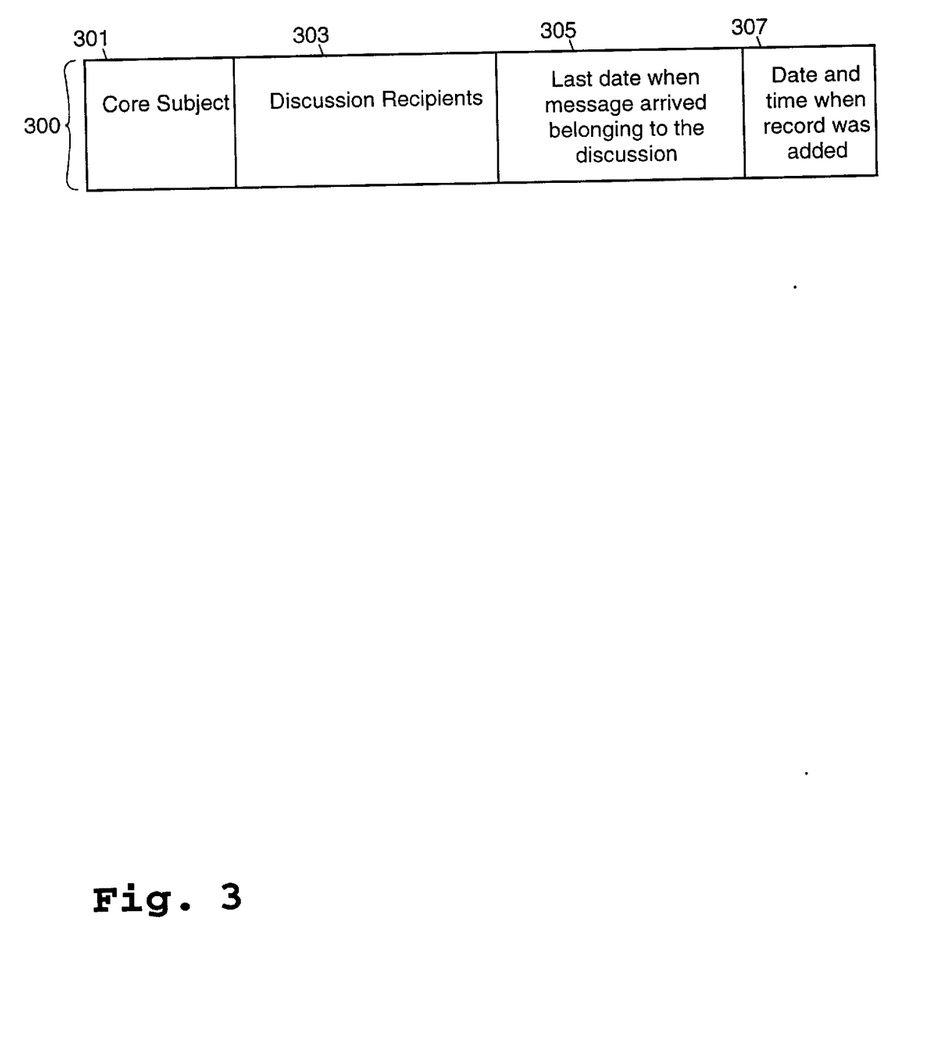
FIG. 3 illustrates the structure of a record stored in the ignored discussion database in accordance with a preferred embodiment.

FIG. 3 indicates the characteristics of the ignored discussion records 300 in the ignored discussion database 209. Those skilled in the art will recognize that the actual field order in the record 300 is simply a design decision and the data stored in the record 300 may be ordered in many other configurations. The core subject field 301 contains characters extracted from the "subject:" line of the message that defined the discussion. The process of determining what characters to store from the message's subject line is described below. One embodiment of the invention allows for up to forty characters of the subject field to be stored. The discussion recipient field 303 contains the e-mail addresses from the "to:" and "cc:" lines of the message. The record 300 also includes a field 307 that contains the date and time when the record 300 was added to the database 209. Finally, the record 300 includes a field 305 that contains the date when the last message associated with the ignored discussion was received.

Figure 4A:
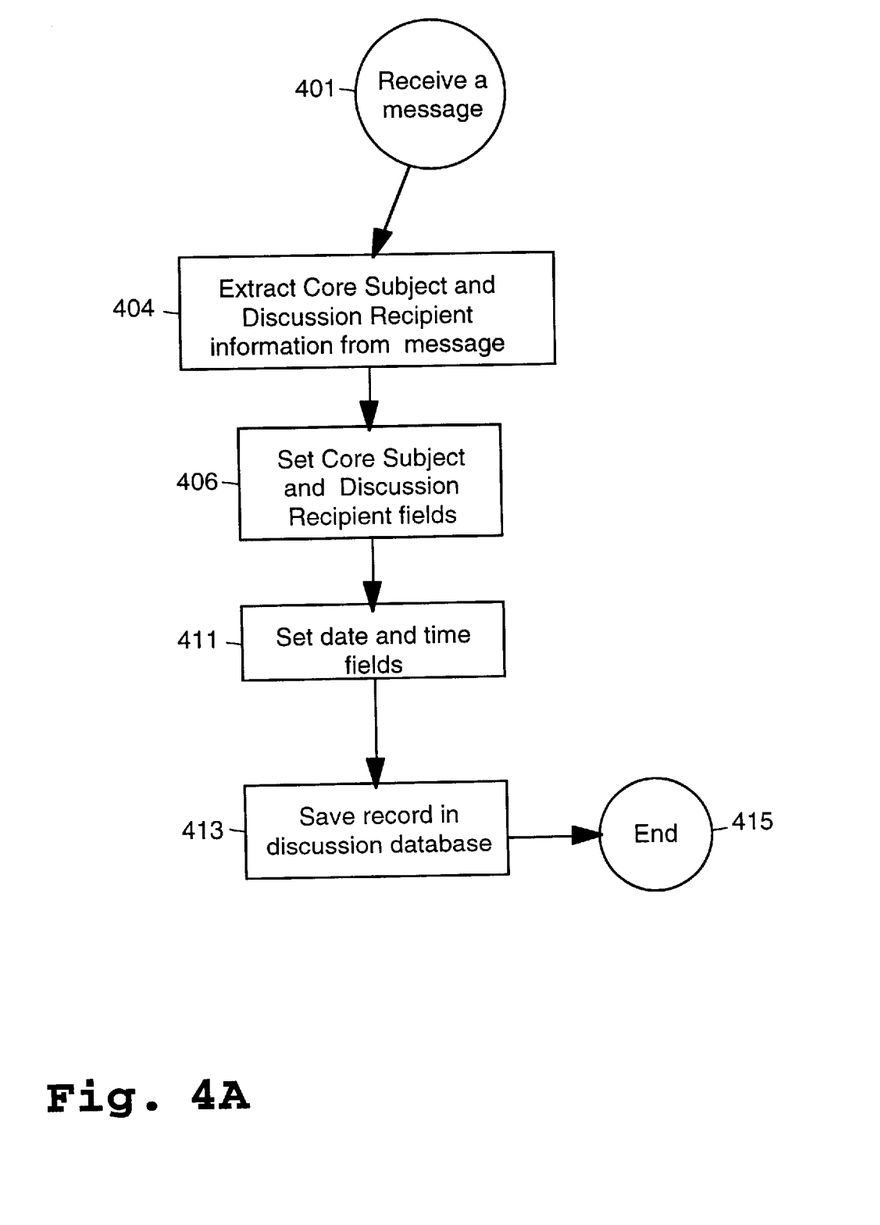
FIG. 4A illustrates the process for adding information contained in a message to a record in the ignored discussion database in accordance with a preferred embodiment.

FIG. 4A is a flow chart indicating how a message is processed to create and add a record in the ignored discussion database 209. First, the process receives a message 401 to analyze. The discussion information is then extracted (described below) from the message 404 and stored 406 in the appropriate fields 301, 303, in the record 300. Next, the data and time field 307 is set to the current date and time, and the last date field 305 is initialized to the current date 411. Finally 413, the record 300 is stored in the ignored discussion database 209 using a database management mechanism and the process exits through the terminal labeled 415.

Figure 4B:
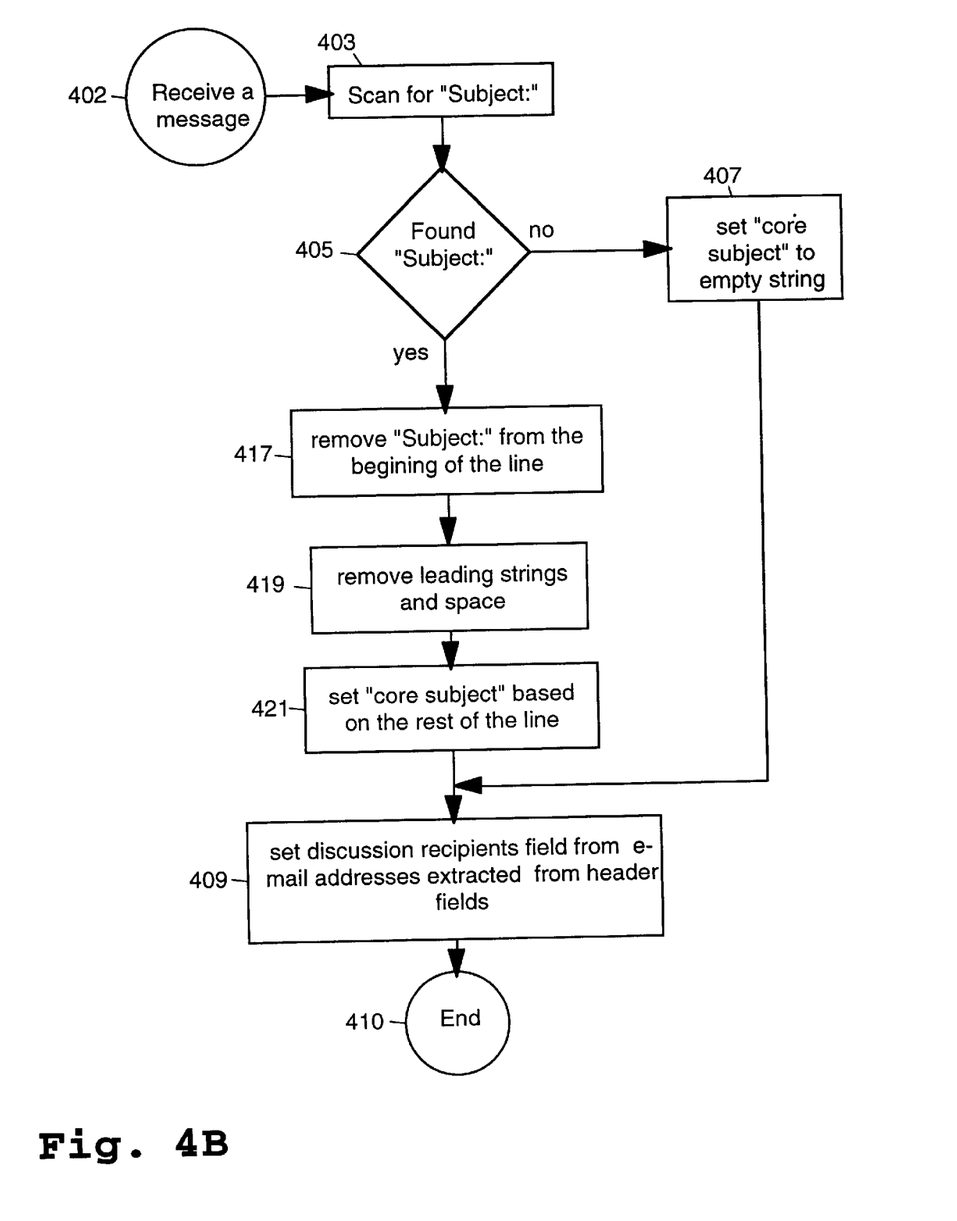
FIG. 4B illustrates the process for determining a discussion from data in a message in accordance with a preferred embodiment.

FIG. 4B is a flow chart indicating how a message is processed to extract discussion information. First, the process receives a message 402 to analyze. Then, as part of the core subject determination mechanism, the message is scanned 403 to locate the first subject field. If analyzing a message using the RFC822 specification, the subject field is indicated by a line starting with "Subject:" (as mentioned above field-names are case independent). If "Subject:" is not found 405, the core subject is set to an empty line 407. If the subject line is found 405, the program removes the "subject:" string 417 and whitespace characters following the ":", along with any of the following strings:"Re:","RE:","re:", "ReN:","reN:","REN:", "Re [N]:","re [N]:", or "RE [N]:" where "N" is an integer 419. Whitespace characters are those that do not represent printing characters. Examples of whitespace characters using the ASCII character set would include characters such as a space, tab, null, backspace or other non-printing characters the programmer determines should be ignored. Finally, the core subject is set to the string that remains in the line 421. At this point, the core subject has been defined. Next 409, as part of the recipient determination mechanism, the list of recipients of the message is determined by scanning the text of the message for the first "To:" and first "Cc:" fields, extracting the e-mail addresses of the recipients of the message and removing duplicated addresses. Finally, the process exits through the terminal labeled 410. The processes just described comprises the message classification mechanism. The message classification mechanism determines the discussion of any message.

Figure 5:
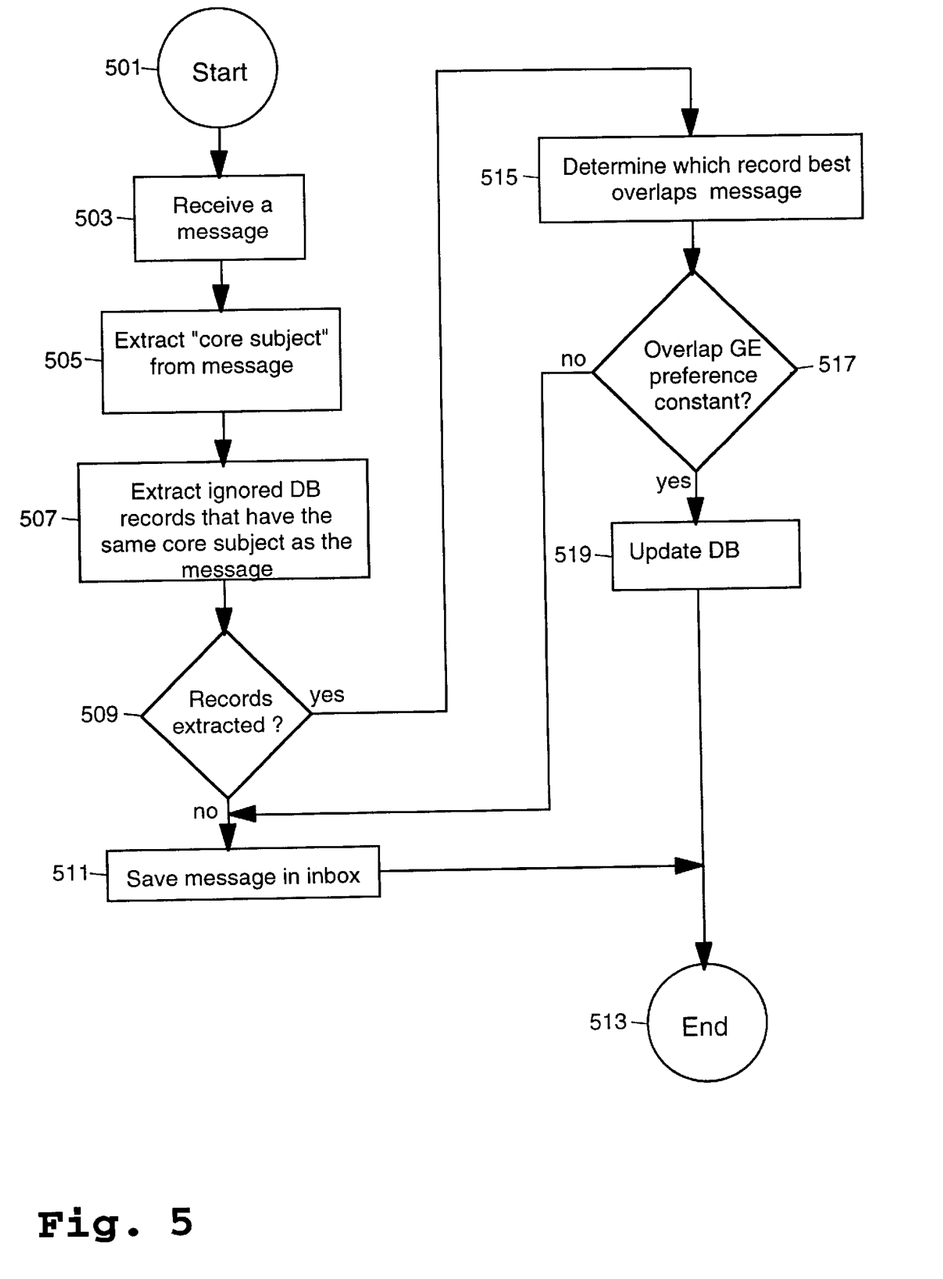
FIG. 5 illustrates the process used to determine whether a newly arrived message is to be ignored, or saved in the recipient's inbox in accordance with a preferred embodiment.
Figure 6:
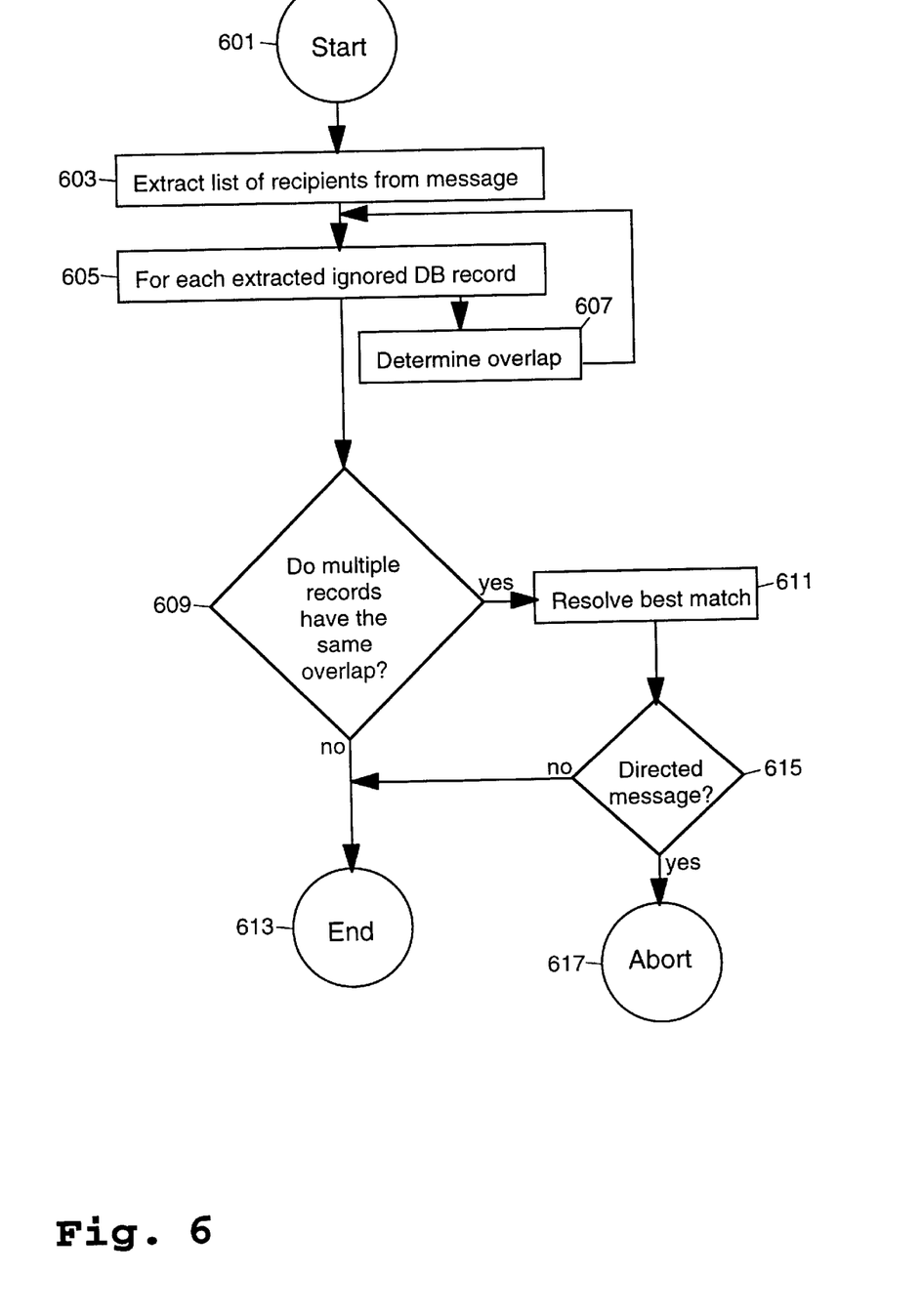
FIG. 6 illustrates the process for determining which record in the ignored discussion database best matches the discussion of the incoming message in accordance with a preferred embodiment.

FIG. 5 illustrates how an e-mail distribution program 203 uses the invention to ignore messages. The process starts at the terminal labeled 501. The e-mail distribution program 203 receives a message 503. Using the message classification mechanism described above for FIG. 4B, the e-mail distribution program 203 extracts the core subject from the message 505, Then 507, using the database management mechanism, the e-mail distribution program 203 retrieves all records 300 from the ignored discussion database 209 that have the same text in the core subject field 301 as the core subject derived from the instant message. If the ignored discussion database 209 did not contain any records that matched the core discussion of the instant message 509, the message is saved 511 in the recipients inbox 205 using the message save mechanism and the process terminates through the terminal labeled 513. If records existed 509 in the ignored discussion database 209 that matched the core subject of the instant message, these discussion records are examined by the overlap determination mechanism, to determine which record best overlaps the discussion of the instant message 515. Overlap is discussed below. If 517 the overlap is suitable when compared to a preset preference constant, the instant message is saved in the recipient's inbox 511. Otherwise, the field labeled 305 in record 300 is updated with the current date 519 and the message is not saved in the recipient's inbox. Finally, the process completes through the terminal block labeled 513. A preferred embodiment uses a value of 50% for the preset preference constant FIG. 6 illustrates how the overlap, as used in step 515, is determined. The process starts at the terminal labeled 601. At this point, a list of recipients is extracted from the message 603. Then 605, for each record extracted from the ignored discussion database (i.e., all the records that have the same core subject) determine the overlap 607 between the recipients of the message and the recipients of the discussion. The overlap is determined by generating two values x and y. The value of x is the number of addresses that appear on at least one of the lists. The value of y is the number of addresses that appear on both lists. For example:

| List 1 | List 2 |
|---|---|
| one | four |
| two | five |
| three | one |

Here the value of x is 5, and the value of y is 1 because only one address is duplicated. The overlap of these two lists is the ratio defined by x/y.

If multiple ignored discussion database records 300 have the same overlap 609, the best match between discussions must be determined 611. The discussion that has had the most recent activity is picked over one that is less recent. This is determined by examining the last date field 305 of the record 300. If the last date field 305 of multiple records 300 are the same, then the record-created date and time field 307 is examined and the record 300 with the most recent entry is used. Next the message is checked to determine if it contains a directed address 615. A directed address occurs if the recipient's e-mail address is included in the message's list of recipients and the recipient's e-mail address is not included in the list of recipients for the best match. When this condition occurs, the new message is immediately added to the recipient's inbox using the message save mechanism and processing completes though the termination blocked labeled 617. This test insures that messages addressed directly to the recipient are not ignored. If the message is not a directed message the process for determining overlap terminates through the termination block labeled 613.

Figure 7:
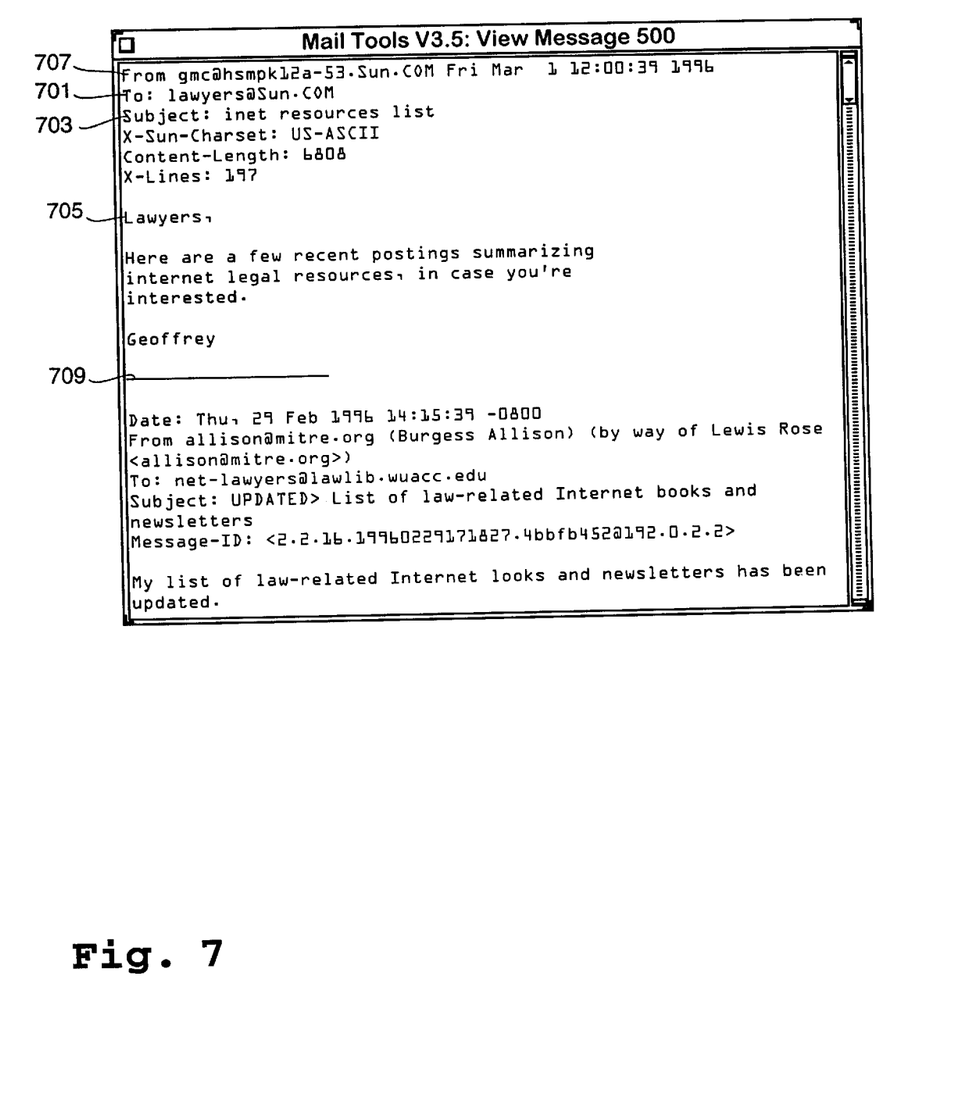
FIG. 7 illustrates a sample e-mail display using a viewing program in accordance with a preferred embodiment.

FIG. 7 illustrates a sample e-mail message displayed by the SUN Mail Tool. Similar displays are provided by other e-mail packages. This message was sent to "lawyers@Sun.Com" as seen by the first "To:" field 701. The core subject is "inet resources list" as seen by the first "Subject:" field 703. The text of the message starts at "Lawyers," 705. This example message has been forwarded by "gmc@hsmpk12a-53.Sun.Com" 707. The forwarded message starts at the line indicated by label 709.

Figure 8:
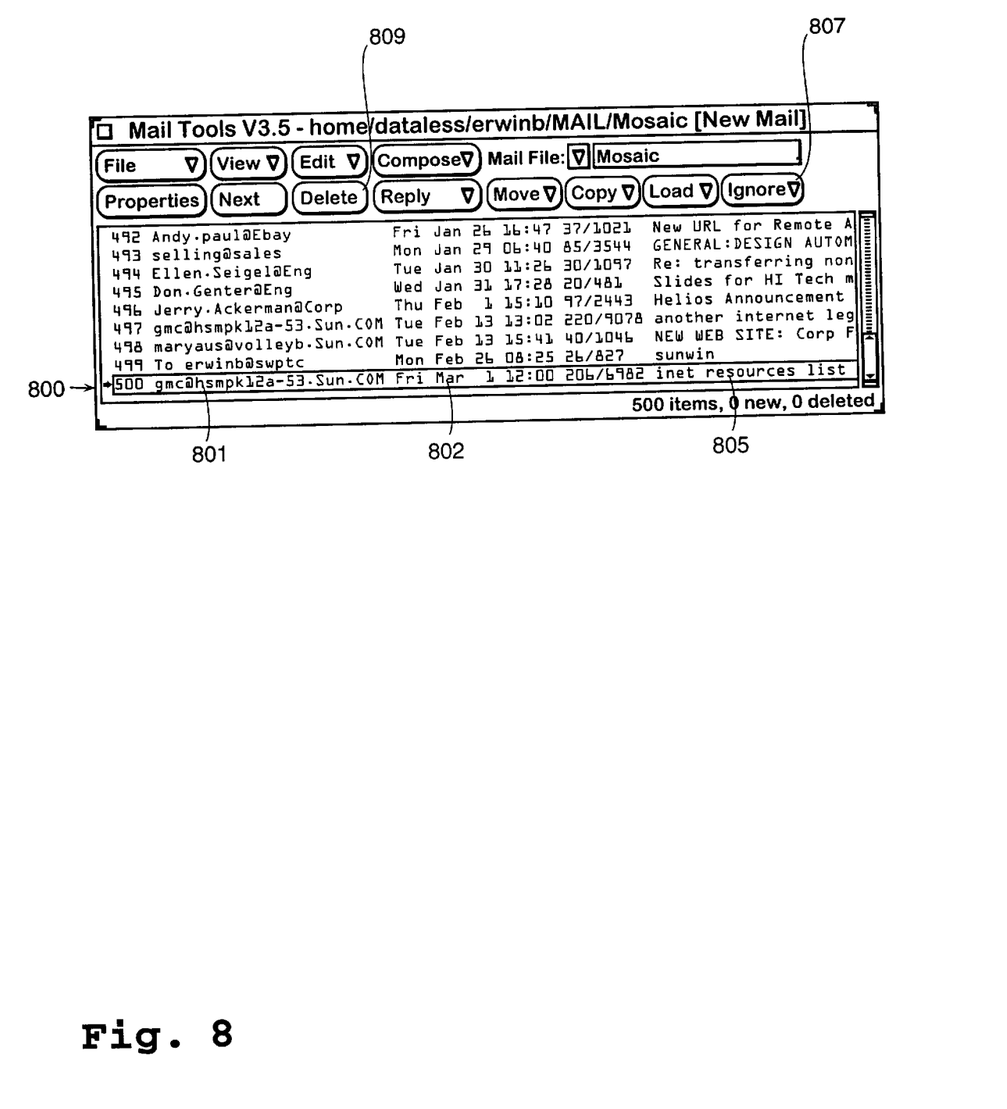
FIG. 8 illustrates a directory listing of an e-mail inbox showing the location of an ignore button in accordance with a preferred embodiment.
Figure 9:
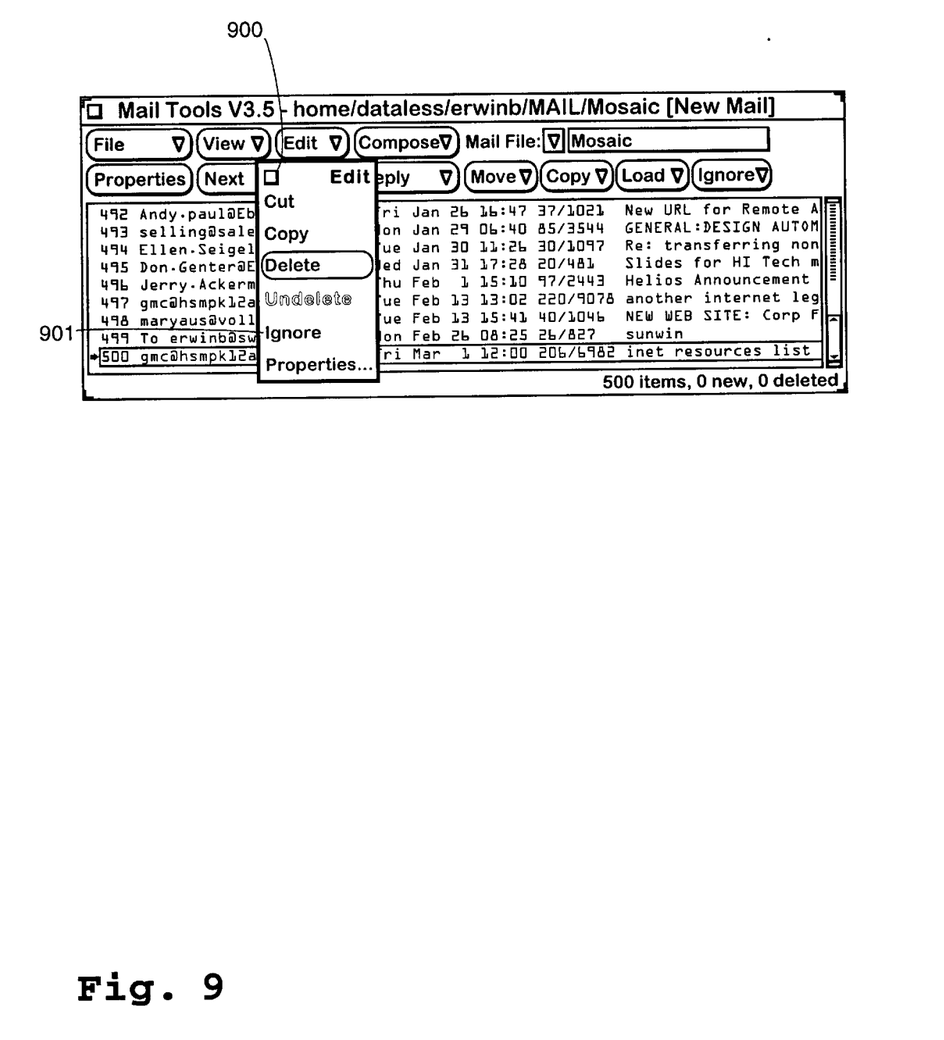
FIG. 9 illustrates the directory listing of an e-mail inbox showing the location of an ignore button in accordance with a preferred embodiment.

FIG. 8 illustrates how the SUN mail tool lists a directory of messages. Again, other mail management programs may implement similar functionality without implementing the exact functionality shown here. The selected message 800 is indicated by a boxed entry. The boxed entry corresponds to the message displayed in FIG. 7. The directory display as shown in FIG. 8 displays information about the underlying message. In particular, the sender of the message 801, the date received 803, and the subject of the message 805. The user can delete the selected message by moving a pointing device over the delete button 809 and activating the pointing device (that is, evoking the function attached to the button). Similarly, the user can add a record to the ignore discussion database by moving a pointing device over the ignore button 807 and activating the pointing device. The ignore button 807 need not be the only way to implement the functionality. Another method is shown in FIG. 9. Here the Edit button pull down 900 contains an ignore option 901 that the user may select. Further, in command line oriented mail programs, the ignore discussion functionality could be invoked by a new command string. In yet another embodiment the e-mail viewing program accesses a previously specified filtering criteria to determine whether an incoming message is a discussion list message. Only if the filter determines that the incoming message is a discussion list message, will the e-mail viewing program display the ignore discussion user interface options. In this circumstance, the command would continue to be accessible through a less prominent means such as a function key combination.

Figure 10:
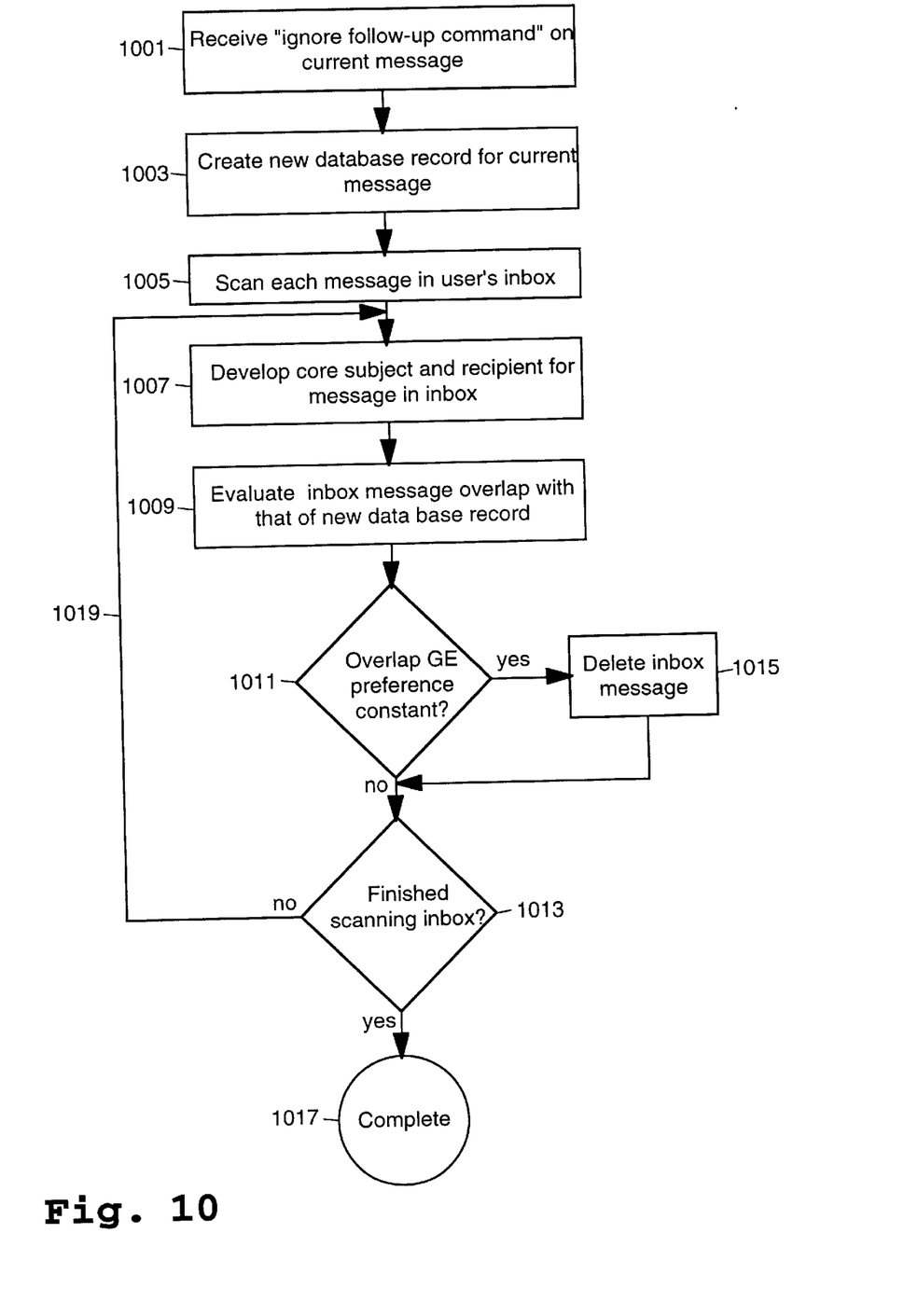
FIG. 10 illustrates the process for removing unread messages from the recipient's inbox upon specifying that a discussion it to be ignored in accordance with a preferred embodiment.

FIG. 10 illustrates the process activated when a selected message is operated on by an ignore command from the user 1001. The process first creates 1003 a new ignored database record 300 in the database 209. This is accomplished by using the process described for FIG. 4A. Once this is accomplished, all new messages associated with this discussion will not be saved to the user's inbox. However, the user's inbox may contain existing messages that belong to the discussion. Therefor, each message in the user's inbox (inbox message) is examined 1005 and the core subject and recipient for the inbox message is extracted 1007. If this core subject does not match with the selected message core subject, the overlap is set to zero 1007. However, if the core subjects match, the recipient overlap is determined 1009. If the overlap is greater than or equal to a preference constant 1011 the inbox message is deleted from the inbox 1015. If the overlap is less than the preference constant 1011 then the next inbox message is retrieved 1013, as indicated by the arrow labeled 1019, and the process continues until all of the inbox messages have been examined. Once all the inbox entries have been examined, the process completes though the terminal labeled 1017.

Figure 11:
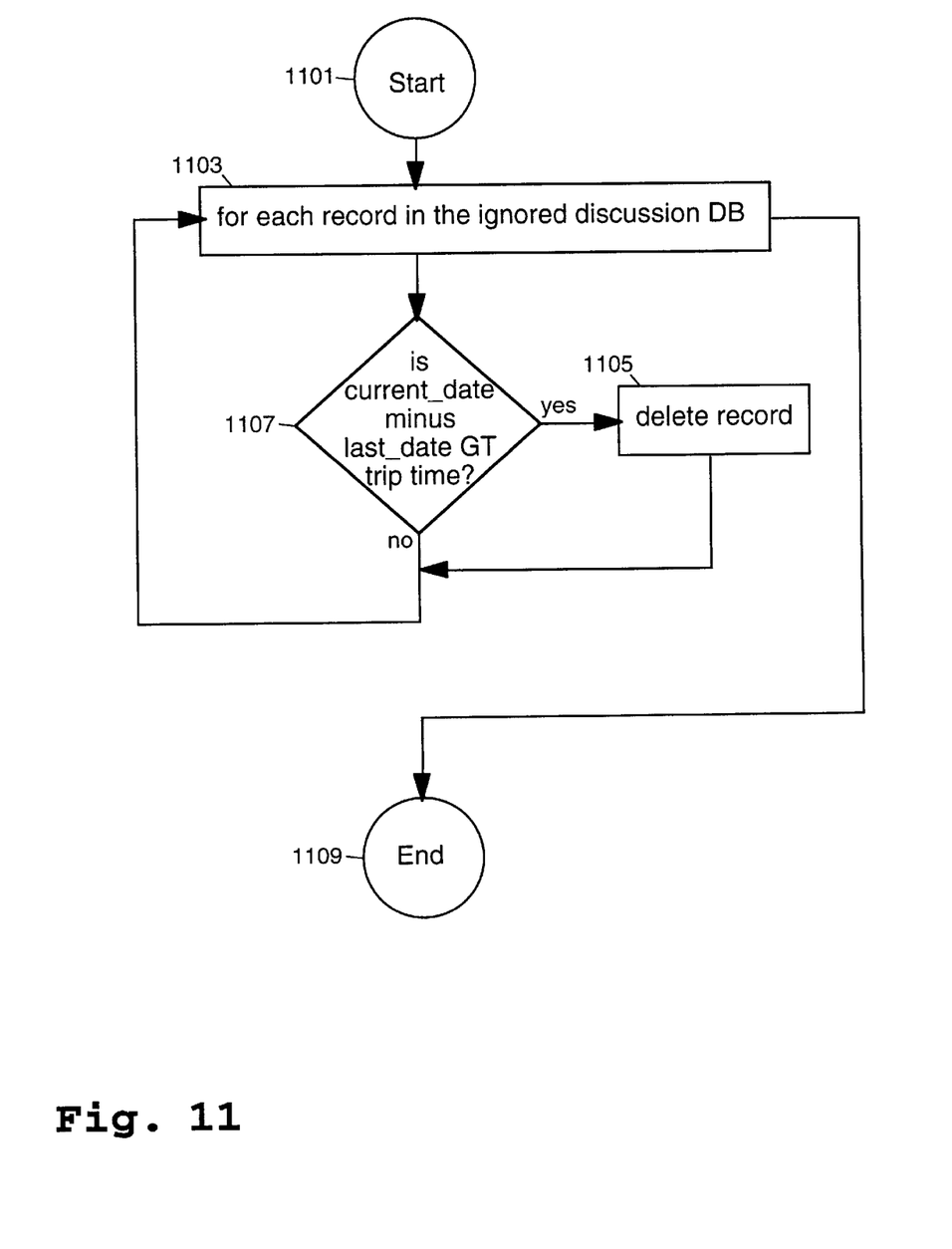
FIG. 11 illustrates a ignored discussion database maintenance process for automatically removing inactive discussions from the ignored discussion database.

Finally, FIG. 11 illustrates a periodic maintenance process for the ignored discussion database. This process is invoked periodically during a period of low computer activity. A preferred embodiment invokes this process every day at 2:00 a.m. This process starts at the terminal labeled 1101. Then 1103 each record 300 in the ignored discussion database is examined 1107 to determine if the discussion has been inactive for longer than some trip time. This determination is based on the current date and the date within the last message field 305 of the record 300 being examined. If the discussion has been inactive for longer then the trip time, the record 300 is deleted 1105. Because the record is deleted from the ignored discussion database, new messages with the same subject will, once again, flow into the recipient's e-mail inbox. This loop continues for all the records 300 in the ignored discussion database and once the last record is examined the process exits through the terminal labeled 1109.

One skilled in the art will understand that the invention as described above teaches a computerized e-mail system that provides additional functionality to the user of the e-mail system by not presenting unwanted junk e-mail to the user.

Further, one skilled in the art will understand that various modifications and alterations may be made in the preferred embodiment disclosed herein without departing from the scope of the invention. Accordingly, the scope of the invention is not to be limited to the particular invention embodiments discussed above, but should be defined only by the claims set forth below and equivalents thereof.

what is claimed is:

1. A computer system having a central processing unit (CPU), a random access memory (RAM) coupled to said CPU, a communications mechanism for receiving a message, a message storage mechanism and a message management mechanism; said message management mechanism further comprising:

an ignored discussion database configured to store information relating to a recipient selected discussion;
   a database management mechanism configured to manage said ignored discussion database; and
   a message classification mechanism configured to determine whether said message is associated with said recipient selected discussion.

2. The computer system of claim 1 wherein said message classification mechanism further comprises:

a core subject determination mechanism configured to determine a core subject of said message; and
   a recipient determination mechanism configured to produce a list of recipients of said message; said core subject and said list of recipients comprising a message discussion.

3. The computer system of claim 2 wherein said message classification mechanism further comprises: an overlap determination mechanism configured to determine whether said message discussion is associated with said recipient selected discussion.

4. The computer system of claim 1 wherein said database management mechanism further comprises: an ignore discussion command mechanism configured to determine a message discussion relating to a selected message and to add said message discussion to said ignored discussion database by using said database management mechanism.

5. The computer system of claim 1 wherein said database management mechanism further comprises: an ignored discussion database maintenance mechanism configured to:

(a) update an ignored discussion database record during processing of an ignored message to reset an inactivity related field; and
   (b) delete said ignored discussion database record after said inactivity related field indicates that said record has been inactive for a suitable period of time.

6. An apparatus for receiving electronic-mail messages comprising:

(a) a computer having a central processing unit (CPU), a random access memory (RAM) coupled to said CPU, a communications mechanism for receiving a message, and a message storage mechanism; and (b) a message management mechanism within said computer comprising:
      an ignored discussion database configured to store information relating to a recipient selected discussion;
      a database management mechanism configured to manage said ignored discussion database;
      a message classification mechanism configured to determine whether said message is associated with said recipient selected discussion; and
      a message save mechanism configured to save said message using said storage mechanism if said message is not associated with said recipient selected discussion.

7. The apparatus of claim 6 wherein said message classification mechanism further comprises:

a core subject determination mechanism configured to determine a core subject of said message; and
   a recipient determination mechanism configured to produce a list of recipients of said message; said core subject and said list of recipients comprising a message discussion.

8. The apparatus of claim 7 wherein said message classification mechanism further comprises: an overlap determination mechanism configured to determine whether said message discussion is associated with said recipient selected discussion.

9. The apparatus of claim 6 wherein said database management mechanism further comprises: an ignore discussion command mechanism configured to determine a message discussion relating to a selected message and to add said message discussion to said ignored discussion database by using said database management mechanism.

10. The apparatus of claim 6 wherein said database management mechanism further comprises: an ignored discussion database maintenance mechanism configured to:

(a) update an ignored discussion database record during processing of an ignored message to reset an inactivity related field; and
   (b) delete said ignored discussion database record after said inactivity related field indicates that said record has been inactive for a suitable period of time.

11. A computer controlled method of receiving electronic mail messages, said method comprising the steps of:

(a) storing information relating to a recipient selected discussion into an ignored discussion database;
   (b) managing said ignored discussion database;
   (c) receiving a message;
   (d) determining whether said message is associated with said recipient selected discussion; and
   (e) saving said message if said message is not associated with said recipient selected discussion.

12. The computer controlled method of claim 11 wherein step (d) further comprises the steps of:

(d1) determining a core subject of said message; and
   (d2) producing a list of recipients of said message; said core subject and said list of recipients comprising a message discussion.

13. The computer controlled method of claim 12 wherein step (d) further comprises the step of: determining whether said message discussion is associated with said recipient selected discussion.

14. The computer controlled method of claim 11 wherein step (b) further comprises the steps of:

(b1) determining a message discussion relating to a selected message; and (b2) adding said message discussion to said ignored discussion database.

15. The computer controlled method of claim 11 wherein step (b) further comprises the steps of:

(b3) updating an ignored discussion database record during processing of an ignored message to reset an inactivity related field, and (b4) deleting said ignored discussion database record after said inactivity related field indicates that said record has been inactive for a suitable period of time.

16. A computer program product comprising:

(a) a computer usable medium having computer readable code embodied therein for causing a computer to receive electronic mail, said computer program product comprising:

(b) computer readable code devices configured to cause said computer to effect an ignored discussion database configured to store information relating to a recipient selected discussion;

computer readable code devices configured to cause said computer to effect a database management mechanism configured to manage said ignored discussion database;

computer readable code devices configured to cause said computer to effect a message classification mechanism configured to determine whether said message is associated with said recipient selected discussion; and computer readable code devices configured to cause said computer to effect a message save mechanism configured to save said message using a storage mechanism if said message is not associated with said recipient selected discussion.

17. The computer program product of claim 16 wherein said message classification mechanism further comprises:

computer readable code devices configured to cause said computer to effect a core subject determination mechanism configured to determine a core subject of said message; and computer readable code devices configured to cause said computer to effect a recipient determination mechanism configured to produce a list of recipients of said message; said core subject and said list of recipients comprising a message discussion.

18. The computer program product of claim 17 wherein said message classification mechanism further comprises: computer readable code devices configured to cause a computer to effect an overlap determination mechanism configured to determine whether said message discussion is associated with said recipient selected discussion.

19. The computer program product of claim 16 wherein said database management mechanism further comprises:

computer readable code devices configured to cause said computer to effect an ignore discussion command mechanism configured to determine a message discussion relating to a selected message; and computer readable code devices configured to cause said computer to add said message discussion to said ignored discussion database by using said database management mechanism.

20. The computer program product of claim 16 wherein said database management mechanism further comprises: computer readable code devices configured to cause said computer to effect an ignored discussion database maintenance mechanism configured to:

update an ignored discussion database record during processing of an ignored message to reset an inactivity related field; and delete said ignored discussion database record after said inactivity related field indicates that said record has been inactive for a suitable period of time.

* * * * *